United States Patent [19]
Meredith

[11] Patent Number: 6,061,626
[45] Date of Patent: *May 9, 2000

[54] DETERMINING ROUTES IN A NETWORK COMPRISING NODES AND LINKS

[75] Inventor: Christopher N. Meredith, Beaconsfield, United Kingdom

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,911

[22] Filed: Apr. 17, 1997

[30] Foreign Application Priority Data

Apr. 25, 1996 [GB] United Kingdom .................... 9608543

[51] Int. Cl.$^7$ ..................................................... G06F 15/50

[52] U.S. Cl. .......................... 701/201; 701/200; 701/208; 701/209

[58] Field of Search ..................................... 701/208, 209, 701/210, 211, 200, 201

[56] References Cited

U.S. PATENT DOCUMENTS

| | | |
|---|---|---|
| 5,036,471 | 7/1991 | Tamura et al. ........................... 701/209 |
| 5,802,492 | 10/1998 | DeLorme et al. ....................... 701/200 |
| 5,850,618 | 12/1998 | Suetsugu et al. ....................... 701/201 |

*Primary Examiner*—William A. Cuchlinski, Jr.
*Assistant Examiner*—Arthur D. Donnelly
*Attorney, Agent, or Firm*—Tony E. Piotrowski; Edward W. Goodman

[57] ABSTRACT

In a method of determining minimal length routes through a network comprising nodes and links, the data defining the nodes and links is divided into two levels of nodes and links, the first higher level being used to determine the major portion of the route. Lower level nodes are attached to a specified point of one or more higher level links. If a start or finish point of a route is in the lower level set, the route is completed by adding the start and/or finish node to the first set together with the links from that node to all the nodes in the first set to which it is connected. This minimizes the time needed to generate the route due to the lower number of nodes and links which have to be examined in order to generate the route.

22 Claims, 2 Drawing Sheets

DETERMINING ROUTES IN A NETWORK COMPRISING NODES AND LINKS

BACKGROUND OF THE INVENTION

1. Field of the Invention

The invention relates to a method of and apparatus for determining a minimal length route between two nodes of a network comprising a plurality of nodes and links between the nodes.

2. Description of the Related Art

There are many applications of such a method and apparatus, one of which is the determination of the shortest route between two places on a map. Maps are now available in the form of digital data, as well as printed on paper, and a number of proposals have been made for using these to automatically generate the "best" route between two locations. Thus, the user enters the start and end places for a proposed journey, and the apparatus computes the "best" route. The term "best" here will depend on criteria which may be entered by the user. For example, whether the use of motorways or toll roads is or is not to be allowed, whether the shortest distance route is desired or the quickest route, whether the route should include a particular place or avoid such a place, etc.

When computing the route, the time taken to complete the computation is approximately proportional to the square of the number of nodes. As a result, while it is desirable to minimize the number of nodes, this reduces the number of places which can be defined. One solution to this problem is to form a hierarchical network with a top level having a limited number of nodes, and a lower level having further nodes which are attached to a particular node in the top level. A plurality of the lower level nodes may be attached to a single top level node. In this way, the top level nodes are used for the main routing calculation, with the attached lower level nodes being used to complete the route at one or both ends. It has been found that such an arrangement can lead to less than optimal routes being generated at each end of the journey as it requires a route through the high level node to which the lower level node is attached whether or not this is the most effective route and, in some cases, this can produce a route which instructs the traveller to pass through the intended destination to the high level node and then return to the intended destination.

OBJECTS AND SUMMARY OF THE INVENTION

It is an object of the invention to enable the provision of a method of and apparatus for determining a minimal length route through a network comprising a plurality of nodes and links which overcomes the disadvantage set forth in the preceding paragraph.

The invention provides a method of determining a minimal length route between two nodes of a network comprising a plurality of nodes and links, the method comprising the steps:

i) dividing the nodes into a first set of high level nodes and high level links, and at least one further set of lower level nodes and lower level links;

ii) attaching each lower level node, using lower level links, to one or more high level links in the first set;

iii) entering a start node and a finish node;

iv) determining whether the start and/or finish nodes are lower level nodes in the at least one further set and, if so, computing the distance from that node to each of the high level nodes at the ends of the high level link(s) to which it is attached;

v) computing a route through the network from the start node to the finish node using the distances calculated in step iv) and the high level nodes and high level links of the first set; and vi) displaying the computed route.

By attaching the lower level nodes to high level links of the high level set rather than to high level nodes, it is possible to prevent re-tracing of parts of the route in the route-finding calculation.

The step of calculating the route may comprise applying the Dijkstra algorithm. This algorithm is disclosed in a paper entitled "A Note on Two Problems in Connexion with Graphs" by E. W. Dijkstra in Numerische Mathematic 1, 269–271 (1959), and enables a minimal length route to be computed. Any other convenient algorithm could, of course, be used.

The network may be a map and the links may be roads, wherein an anticipated journey time is associated with each link and/or portion of a link and the routing algorithm is arranged to compute either a shortest distance route or a shortest journey time route.

By this means, the journey between two points may be defined in terms of the minimum time taken, for example, by extensive use of motorways or other roads on which high speeds are possible, or in terms of minimum distance covered, which may, for example, involve routes through the centers of busy towns or cities.

The method may comprise the further steps:

vii) entering nodes and/or links which are to be excluded from the route; and viii) computing the minimal length route excluding the entered nodes and/or links.

This may be used to avoid the use of certain classes of links, for example, motorways or toll roads, or to avoid places which are notorious bottlenecks at the time of the expected journey.

The method may comprise the further steps:

vi) entering one or more nodes and/or links which are to be included in the route; and viii) computing the minimal length route which passes through the entered node(s) or along the entered links.

This may be used to include a particular place where a break in the journey is desired, for example, to visit a place of interest, or the house of a friend or relative, or to ensure that a particular route which passes by some point or area of interest is included in the route.

The method may comprise the further steps:

ix) attaching objects of interest to links on which they are located;

x) examining each link on the computed route to determine whether any objects of interest are present; and xi) displaying any objects of interest present on the links of the computed route.

This enables many further objects of interest to be included in the database and attached to the route without requiring an increase in the number of high level nodes, and the consequent increase in route computing time. The objects of interest may be diverse and a selected sub-group of these objects only may be displayed with the route if desired. Examples are, parking places, public toilets, churches, restaurants, etc.

The invention further provides apparatus for determining a minimal length route between two nodes of a network comprising a plurality of nodes and links, the apparatus comprising means for storing data defining a first high level set of high level nodes and high level links, and at least one further lower level set of lower level nodes and lower level links, means for attaching each lower level node of the further set to a defined point on one or more high level links of the first set by defining lower level links in the lower level set to said defined points, means for entering a start node and a finish node, means for determining whether the start and/or finish nodes are lower level nodes in the at least one further set and, if so, computing the distance from that lower level node to each of the high level nodes at the end of the high level link(s) to which the lower level node is attached, means for computing a route between the start and finish nodes using the high level nodes and high level links of the first set and, if required, the computed distances from the lower level nodes in the further network to the high level nodes in the first set which terminate the high level links to which the lower level node in the further network is attached, and means for indicating the calculated route.

Such apparatus allows the database to contain a large number of nodes without substantially increasing the time necessary to compute a route between any two of the nodes. By attaching the lower level nodes to high level links in the high level set rather than to high level nodes, it is possible to avoid the route retracing its steps from the nearest high level node in the high level set to the selected lower level node in the lower level set. Thus, if the lower level node is attached to a high level link in the first set, that high level link will be entered from one of the two high level nodes defining the ends of the high level link, depending on the other end of the route, and will progress along the high level link to the point of attachment and then pass from the point of attachment along a lower level link to the lower level node.

The means for indicating the calculated route may comprise a visual display unit which may comprise a liquid crystal display panel. In a hand-held apparatus, a display in the form of a liquid crystal display panel is convenient for size and power requirements, but when the apparatus forms part of a personal computer, a CRT display unit may be more appropriate. A further alternative is to indicate the route by means of a print-out which may either be an integral part of the apparatus or may be connectable via a plug and socket connection. Other possibilities include a voice output which may be particularly useful in a mobile environment, such as a car, where route guidance may be given by a synthesized voice output.

The means for entering the start and finish nodes may be a keyboard. This is a well-known, familiar interface for most users, but alternative means would be possible depending on the construction of the apparatus. Some examples are a mouse and menu system, voice activation using speech recognition technology, or pen entry on a sensitive pad with appropriate handwriting analysis processing apparatus.

The means for calculating the route may comprise a programmed microprocessor which may be arranged to perform the Dijkstra algorithm to compute the route.

The apparatus may comprise means for receiving memory means, said memory means storing data representing the first and further sets of nodes and links.

The memory means may be detachably connected and may comprise a card containing a read-only memory.

In this way, a plurality of memory means may be provided each defining a different network, for example, maps of different countries or different areas within countries.

The memory means may contain the programming information for the microprocessor. In this way, particular processes, which may be specific to the network data in the memory means, can be associated solely with that data. Thus, the program may occupy less memory than if each apparatus had to contain operating program information for all possible networks, and also enables the program to be updated whenever new network data cards are issued.

The nodes may represent places on a map, and the links may represent map routes between the nodes. In one example, the nodes represent intersections of roads, and the links represent the roads linking the nodes. In this case, each node will have a plurality of links connected to it, unless it represents the end of a cul-de-sac.

Objects of interest lying on the routes or roads are stored in association with the link, and means are provided for inspecting each link to determine whether selected objects of interest are present on the link, and displaying the selected objects of interest which lie on the calculated route.

By this means, further information concerning the route may be displayed without substantially increasing the time required for generating the route. This information may take many forms, for example, parking places or rest areas, public toilets, churches, hotels, public houses, etc. Any sub-set may be selected, and special cards issued by chains of restaurants or hotels may show all their establishments on a route automatically.

BRIEF DESCRIPTION OF THE DRAWINGS

The above and other features and advantages of the invention will be apparent from the following description, by way of example, of an embodiment of the invention with reference to the accompanying drawings, in which.

DETAILED DESCRIPTION OF THE PREFERRED EMBODIMENT(S)

In order to apply the routing principle of the invention to a navigational aid, a geographical database founded on the concept of links and nodes is generated from map information. At is simplest level, nodes are road intersections and links are the connecting roads. Additional information, such as towns, points of interest, motorway junction numbers, characteristics of roads, such as dual carriageway, are associated with the applicable nodes and links.

The database is separated into a number of hierarchical levels, in this particular embodiment, two levels but the principle could be extended to more than two levels. Nodes can be either real (high level) nodes which exist in the higher level and are used in the route generation, or attached (lower level) nodes which relate to a lower level location not included in the high level routing set of nodes. The attached nodes are attached by lower level links to one or more (high level) links between the real nodes at a defined position along the high level link. There may typically be many more attached nodes than real nodes. Attached nodes may lie on any of the high level links as well as being located some distance from the high level link and attached by lower level links.

As an example, a country such as Germany could be represented by a map having approximately 30000 routing nodes but has approximately 90000 named places. Normally, this would require a database with a routing map having approximately 110000 nodes, which would result in a much longer route determination time. It should be noted that many of the 30000 routing nodes will not correspond with named places; road intersections between towns are not normally named but are required as routing nodes. Using the technique of attaching lower level nodes to high level links, it is possible to split these 110000 nodes into a first 30000 high level node (and high level link) database for routing, with a second database of 80000 attached (lower level) nodes and lower level links, giving a significant saving in route determination time while maintaining substantially correct routing. In general, the time taken to determine a route is approximately proportional to the square of the number of nodes.

A further benefit of the use of attached nodes is that they can be used to place groups of objects onto a map without disturbing the basic map data. Such groups of objects may, for example, be a chain of hotels, each being specified by an attached node, or a chain of supermarkets, again, each being specified by an attached node.

Figure 1:
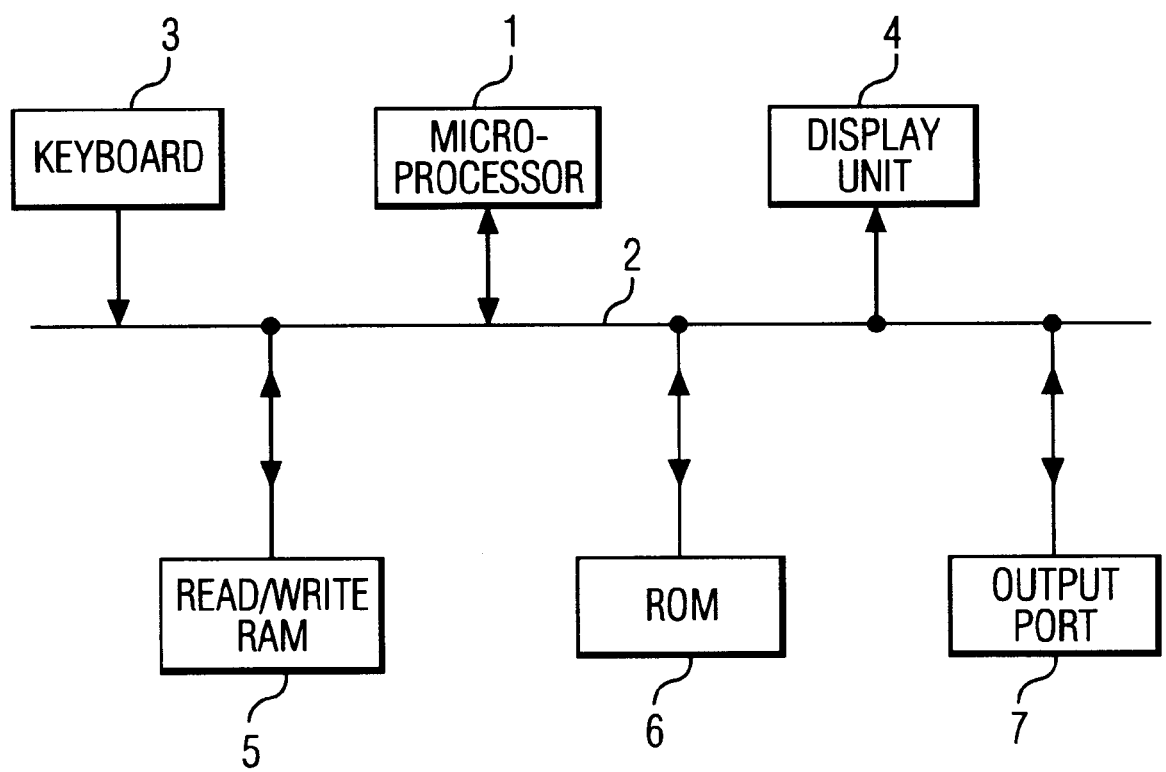
FIG. 1 is a block schematic diagram of an embodiment apparatus according to the invention.

FIG. 1 shows, in block schematic form, an embodiment of apparatus according to the invention which comprises a microprocessor 1 which communicates via an address and data bus 2 with a keyboard 3, a display unit 4, a read/write random-access memory 5, a read-only memory 6, and an output port 7 by means of which data may be passed to an external unit, for example, a printer.

The keyboard 2 is used to enter instructions which include the start and finish nodes of a route to be generated. Further instructions may be entered, such as links or nodes to be included or excluded from the route to be generated, and special objects of interest, which may be attached to the high level links of the generated route, which it is desired to have displayed. Various other parameters may be entered depending on the application. For example, when the network represents a map of an area or country and is used to plan journeys, then details of fuel consumption, etc., may be entered in order to generate an approximate cost for the journey.

The ROM 6 contains data which represents the network and, in particular, the nodes and links which typically, in the case of a road map, represent road intersections or terminations, and the roads linking them. Each of the nodes is named and the corresponding name for the node can be entered via the keyboard 3. The data representing the nodes and links is divided into a first high level set representing a base routing network which contains a restricted number of high level nodes and high level links, and at least one further set which represent further (attached) lower level nodes (and lower level links), which are attached to one or more high level links at specified locations on those high level links. The ROM 6 also contains the microprocessor operating system and applications program.

The display unit 4 in this embodiment comprises a liquid crystal display panel which enables a compact construction for the apparatus and battery operation. In principle, however, any convenient form of display may be used, including a CRT monitor when the apparatus forms part of a desk-top personal computer, or a voice output if a voice synthesis unit is included. A voice output may be particularly useful in an in-car application where road safety considerations prevent easy use of visually presented instructions.

The RAM 6 serves a working memory for the microprocessor 1 and will contain the data used by the display unit 4 to present the route to the user.

The output port 7 may be used to transfer data to an external unit, for example, a printer, using any convenient format, for example, RS232.

Figure 2:
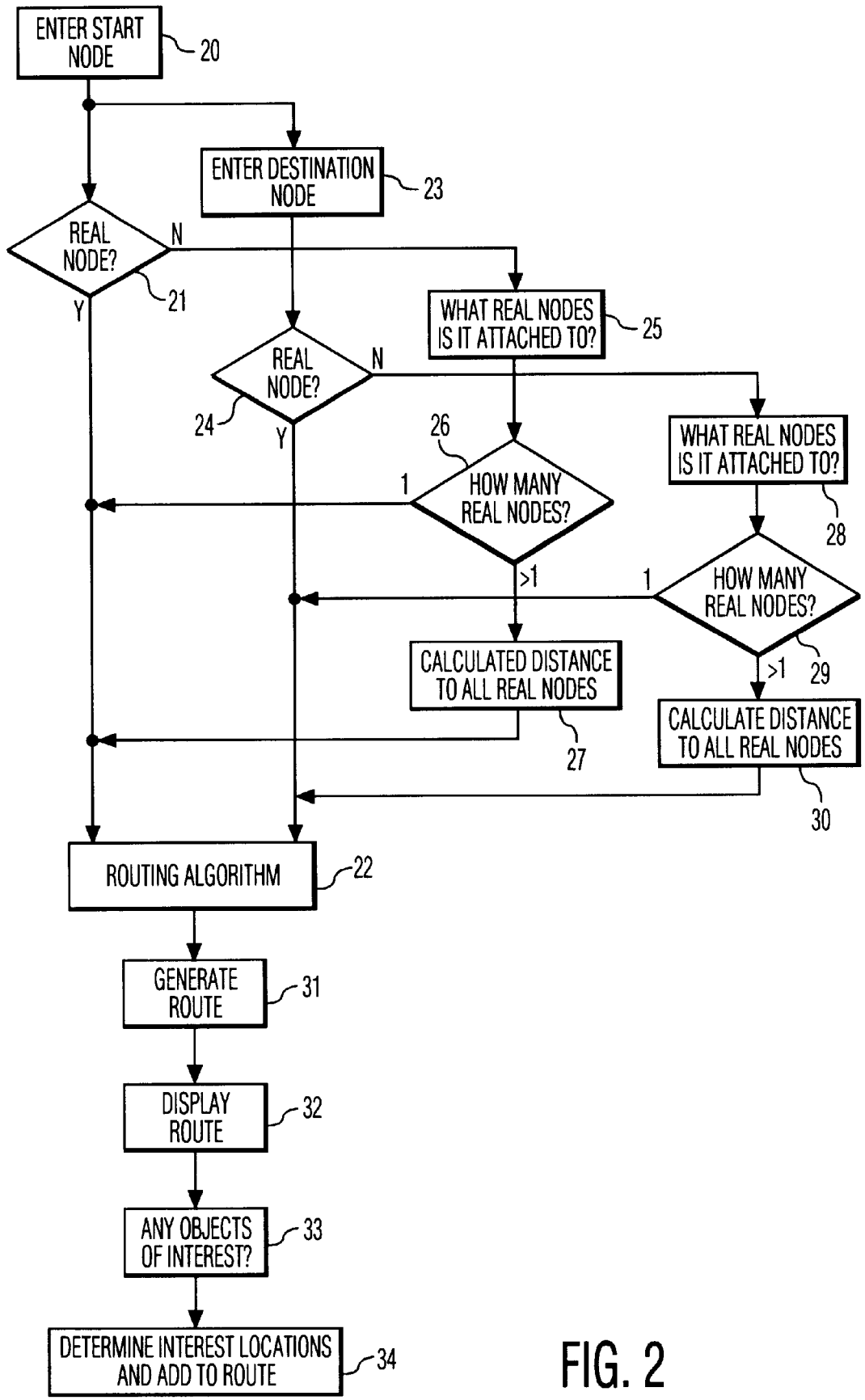
FIG. 2 is a flow diagram illustrating a method according to the invention.

The operation of the apparatus shown in FIG. 1 will now be described using the flow diagram shown in FIG. 2.

The process starts, box 20, by entering the start nodes using the keyboard 3 or any other input means which may be provided. In the case of a road map route generator, the start node will be a place, and its name can conveniently be entered by a QWERTY keyboard which may form at least part of the keyboard 3. The place name may be represented either by a real (high level) node in the first set or by an attached (lower level) node in the further set(s). The microprocessor 1, therefore, compares the entered place name with the names of the nodes in the database and determines, box 21, whether it is a real node, i.e., a high level node in the first set, or an attached node, i.e., a lower level node in a further set. If it is a real node, then the data is entered as the start node for the routing algorithm, box 22. A similar process is performed for the finish node, box 23 representing the entry by the user via the keyboard 3 of the destination place name, and box 24 representing the decision as to whether the destination is a real node.

If the start node is not a real (high level) node, it will be attached to one or more real (high level) links (by lower level links, if necessary) at a specified point along the length(s) of the high level link(s). The microprocessor consequently reads the data in the ROM 6 relating to the attached (lower level) node and determines which high level links the lower level node is attached to, and, consequently, to which real (high level) nodes the attached node is attached to, box 25. The microprocessor then determines whether the attached node is connected to one real node or to a plurality of real nodes, box 26. In this respect, if an attached node is connected to a high level link at one end, i.e., at a real node, it is considered to be connected directly to one real node only. If the attached node is connected directly to a single real node, then the real node is used for routing purposes and the distance from the attached node to the real node, which is defined by the attached node lower level link data, is added to the generated route.

If the start node is an attached node connected to more than one real node, i.e., it is attached intermediate the ends of one or more high level links, then the distances from the attached node to each of the real nodes, to which it is connected via the high level links to which it is attached, are calculated, box 27. This information is then entered into the routing algorithm, box 22, the attached node forming the start node for the routing algorithm and the real nodes to which it is connected, and the distances therefrom forming the first steps of the algorithm.

Similarly, if the destination node is not a real node, it will be an attached node and will be attached to one or more real (high level) links at a specified point along its (their) length(s). The microprocessor, consequently, reads the data in the ROM 6 relating to the attached node and determines which high level links the node is attached to, and, consequently, which real nodes the attached node is attached to, box 28. The microprocessor then determines whether the attached node is connected to one real node or a plurality of real nodes, box 29.

If the destination node is an attached node connected to more than one real node, i.e., it is attached intermediate the ends of one or more real (high level) links, then the distances from the attached node to each of the real nodes, to which it is connected via the high level links to which it is attached, are calculated, box 30. This information is then entered into the routing algorithm, box 22. Thus, the attached destination node is effectively added to the network as a real node with links of the calculated length to all the other real nodes to which it is connected.

Once the details of the start and destination nodes have been entered, and if the start and/or destination nodes are attached nodes they are transferred to the first set to become real nodes with links of the calculated lengths to the real nodes to which they are connected, then the microprocessor 1 generates a route in known manner using the Dijkstra algorithm, box 31. Having generated the route, which is stored in the RAM 5, the microprocessor 1 then causes the data defining the route to be applied to the visual display unit 4 over the bus 2 to provide a description of the route to the user, box 32.

An optional feature is to attach additional virtual nodes along the links where there are objects of interest. These virtual nodes are not used in generating the route but indicate the distance along a high level link at which an object of interest is located. If this feature is included, then once the route has been generated and before it is displayed, each high level link of the route is examined to determine whether it has any objects of interest attached to it, box 33. If so, the locations are determined and their descriptions added to the route, box 34, before passing the route to the visual display unit.

Instead of passing the routing information, either with or without the additional object of interest information, to the visual display unit, it may be passed through the output port 7 to an external printer to provide a hard copy route description.

While the invention has been exemplified with its application to obtaining a route on a map, it could be applied to any other network comprising nodes and links where a hierarchical structure is appropriate.

From reading the present disclosure, other modifications will be apparent to persons skilled in the art. Such modifications may involve other features which are already known in the design and use of network routing methods and systems and component parts thereof, and which may be used instead of, or in addition to, features already described herein. Although claims have been formulated in this application to particular combinations of features, it should be understood that the scope of the disclosure of the present application also includes any novel feature or any novel combination of features disclosed herein either explicitly or implicitly, or any generalization of one or more of those features which would be obvious to persons skilled in the art, whether or not it relates to the same invention as presently claimed in any claim and whether or not it mitigates any or all of the same technical problems as does the present invention. Applicant hereby gives notice that new claims may be formulated to such features and/or combinations of such features during the prosecution of the present application or of any further application derived therefrom.

What is claimed is:

1. A method of determining a route between two nodes of a network having a plurality of nodes connected by links, the method comprising the steps:

dividing the nodes into a first set of high level nodes and high level links, and at least one further set of lower level nodes and lower level links;

attaching each lower level node, via lower level links, to a defining point on one or more high level links in the first set of high level nodes;

entering a start node and a finish node;

determining whether the start node is in the at least one further set of lower level nodes, and, if said start node is in said at least one further set, computing a start distance from said start node, along said lower level link to the defining point on the high level link, and to each of the high level nodes at the ends of the high level link(s) to which said start node is attached;

determining whether the finish node is in the at least one further set of lower level nodes, and, if said finish node is in said further set, computing a finish distance from said finish node, along said lower level link to the defining point on the high level link, and to each of the high level nodes at the ends of the high level link(s) to which said finish node is attached; and computing a computed route through the network from the start node to the finish node using said start and finish distances and the high level nodes and high level links of the first set.

2. The method as claimed in claim 1, in which said computing step comprises applying the Dijkstra algorithm to compute the route.

3. The method as claimed in claim 1, in which the network is a map and the links are roads, wherein an anticipated journey time is associated with each lower level link, each high level link and/or portion of a high level link, and the routing algorithm is arranged to compute either a shortest distance route or a shortest journey time route.

4. The method as claimed in claim 1, wherein the method further comprises the steps:

entering excluded nodes and/or links which are to be excluded from the route; and computing said route excluding the excluded nodes and/or links.

5. The method as claimed in claim 1, wherein the method further comprises the steps:

entering one or more included nodes and/or links which are to be included in the route; and computing said route which includes passing through the included node(s) or links.

6. The method as claimed in claim 1, wherein the method further comprises the steps:

attaching objects of interest to high level links on which they are located;

examining each high level link on the computed route to determine whether any objects of interest are present; and displaying any objects of interest present on the high level links of the computed route.

7. An apparatus for determining a route between two nodes of a network having a plurality of nodes connected by links, the apparatus comprising:

means for storing data defining a first high level set of high level nodes and high level links, and at least one further lower level set of lower level nodes and lower level links;

means for attaching each lower level node of the further set to a defined point on one or more high level links of the first set by defining lower level links extending from the lower level nodes in said lower level set to said defined points on the high level links;

means for entering a start node and a finish node;

means for determining whether the start node is a lower level node in the at least one further set, and, if said start node is in said further set, computing a start distance from said start node to said defining point on the high level link via said lower level link, and to each of the high level nodes at the ends of the high level link(s) to which said start node is attached;

means for determining whether the finish node is a lower level node in the at least one further set, and, if said finish node is in said further set, computing a finish distance from said finish node to said defining point on the high level link via said lower level link, and to each of the high level nodes at the end of the high level link(s) to which said finish node is attached;

means for computing a route between the start and finish nodes using the high level nodes and high level links of the first set and, if required, said start and finish distances of the lower level links connecting the start and finish nodes to the high level links.

8. The apparatus as claimed in claim 7, where in the apparatus further comprises means for indicating the calculated route including a visual display unit.

9. The apparatus as claimed in claim 8, in which the visual display unit comprises a liquid crystal display panel.

10. The apparatus as claimed in claim 7, wherein the apparatus further comprises means for indicating the calculated route including means for transferring data representing the calculated route to a printer.

11. The apparatus as claimed in claim 10, wherein said apparatus further comprises a printer.

12. The apparatus as claimed in claim 7, in which the means for entering the start and finish nodes comprises a keyboard.

13. The apparatus as claimed in claim 7, in which the means for computing the route comprises a programmed microprocessor.

14. The apparatus as claimed in claim 13, in which the microprocessor is programmed to perform the Dijkstra algorithm for computing the route.

15. The apparatus as claimed in claim 7, wherein said storing means comprises memory means for storing data representing the first and further sets of nodes and links, and said apparatus further comprises means for receiving said memory means.

16. The apparatus as claimed in claim 15, in which the memory means is detachably connected to said receiving means.

17. The apparatus as claimed in claim 16, in which the memory means comprises a card containing a read-only memory.

18. The apparatus as claimed in claim 13, in which the the programming information for the microprocessor is stored in said storing means.

19. The apparatus as claimed in claim 7, in which the nodes represent places on a map and the links represent map routes between the nodes.

20. The apparatus as claimed in claim 19, in which said nodes represent intersections and said links represent roads between intersections.

21. The apparatus as claimed in claim 20, in which objects of interest lying on the route or roads are stored in association with a corresponding high level link, and said apparatus further comprises:

means for inspecting each high level link to determine whether selected objects of interest are present on the high level link; and means for displaying the selected objects of interest which lie on the route.

22. A method for determining a route between two nodes of a network having a plurality of nodes connected by links, said method comprising:

dividing said nodes into a first set of high level nodes and high level links, and at least one further set of lower level nodes and lower level links;

attaching each lower level node to one or more high level links in the first set of high level nodes using said lower level links;

entering a start node and a finish node; and computing a route through the network from the start node to the finish node using the lower level nodes and lower level links of the at least one further set, and the high level nodes and high level links of the first set.

* * * * *